United States Patent
Lefevre et al.

(10) Patent No.: US 12,436,228 B2
(45) Date of Patent: Oct. 7, 2025

(54) DISCONTINUOUS RADAR TRANSMISSION FOR INTERFERENCE MITIGATION

(71) Applicant: VEONEER SWEDEN AB, Vargarda (SE)

(72) Inventors: Andreas Lefevre, Niederwerrn (DE); Jonathan Moss, Unterschleissheim (DE); Martin Fuchs, Unterschleissheim (DE); Michael Kritzner, Niederwerrn (DE); Hansjerg Goelz, Unterschleissheim (DE)

(73) Assignee: MAGNA ELECTRONICS SWEDEN AB, Vårgårda (SE)

( * ) Notice: Subject to any disclaimer, the term of this patent is extended or adjusted under 35 U.S.C. 154(b) by 659 days.

(21) Appl. No.: 17/634,107

(22) PCT Filed: Aug. 12, 2020

(86) PCT No.: PCT/EP2020/072645
§ 371 (c)(1),
(2) Date: Feb. 9, 2022

(87) PCT Pub. No.: WO2021/028482
PCT Pub. Date: Feb. 18, 2021

(65) Prior Publication Data
US 2022/0365169 A1   Nov. 17, 2022

(30) Foreign Application Priority Data
Aug. 13, 2019   (EP) .................................... 19191476

(51) Int. Cl.
*G01S 7/02* (2006.01)
*G01S 13/32* (2006.01)
*G01S 13/931* (2020.01)

(52) U.S. Cl.
CPC ............ *G01S 7/023* (2013.01); *G01S 7/0233* (2021.05); *G01S 7/0235* (2021.05);
(Continued)

(58) Field of Classification Search
CPC ...... G01S 7/023; G01S 7/2813; G01S 13/931; G01S 13/003
(Continued)

(56) References Cited

U.S. PATENT DOCUMENTS 3,911,432 A * 10/1975 Williams ............... G01S 7/0235
342/59
4,047,172 A * 9/1977 Bauer ..................... G01S 7/527
367/901
(Continued)

FOREIGN PATENT DOCUMENTS

EP   3489710 A1   5/2019
WO   2019106656 A1   6/2019

OTHER PUBLICATIONS

International Search Report and Written Opinion of PCT/EP2020/072645, mailed Oct. 26, 2020.

*Primary Examiner* — Michael W Justice
(74) *Attorney, Agent, or Firm* — DICKINSON WRIGHT PLLC

(57) ABSTRACT

A radar transceiver (400) including a transmit branch (450, 455, TX) arranged to transmit a radar signal at a frequency F(t), and a receive branch (RX, 405, 410, 420, 430, 460) arranged to receive a radar signal, wherein the receive branch comprises an interference monitoring circuit (430) configured to monitor frequencies adjacent to the frequency F(t) for interference, and to generate a control signal (440) if interference is detected at the adjacent frequencies, wherein the transmit branch is arranged to be paused in response to the control signal (440).

12 Claims, 6 Drawing Sheets

(52) U.S. Cl.
CPC ............ *G01S 7/0236* (2021.05); *G01S 13/32* (2013.01); *G01S 13/931* (2013.01)

(58) Field of Classification Search
USPC .................................................. 342/70, 159
See application file for complete search history.

(56) References Cited

U.S. PATENT DOCUMENTS

| | | | | |
|---|---|---|---|---|
| 5,005,210 | A * | 4/1991 | Ferrell | H04B 17/15 |
| | | | | 340/5.74 |
| 5,153,594 | A * | 10/1992 | Moffat | G01S 7/38 |
| | | | | 342/15 |
| 6,628,724 | B2 * | 9/2003 | Bannasch | H04B 13/02 |
| | | | | 375/259 |
| 6,914,949 | B2 * | 7/2005 | Richards | H04B 1/719 |
| | | | | 375/346 |
| 7,375,676 | B1 * | 5/2008 | Loberger | G01S 7/2928 |
| | | | | 342/99 |
| 7,450,056 | B2 * | 11/2008 | Shirakawa | G01S 7/0232 |
| | | | | 342/159 |
| 7,605,745 | B2 * | 10/2009 | Honda | G01S 13/345 |
| | | | | 342/159 |
| 8,169,361 | B2 * | 5/2012 | Yamano | G01S 7/352 |
| | | | | 342/159 |
| 8,300,500 | B2 * | 10/2012 | Onishi | G01S 15/96 |
| | | | | 367/98 |
| 8,665,140 | B2 * | 3/2014 | Nakagawa | G01S 7/298 |
| | | | | 342/146 |
| 9,772,397 | B1 * | 9/2017 | Bordes | G01S 7/0232 |
| 9,952,312 | B2 * | 4/2018 | Corbett | G01S 7/023 |
| 10,067,221 | B2 * | 9/2018 | Ginsburg | G01S 7/352 |
| 10,324,165 | B2 * | 6/2019 | Bordes | G01S 13/325 |
| 10,514,452 | B2 * | 12/2019 | Kim | G01S 13/347 |
| 10,670,700 | B2 * | 6/2020 | McMahon | A61B 5/0017 |
| 10,983,203 | B2 * | 4/2021 | Kim | G01S 13/347 |
| 11,137,476 | B2 * | 10/2021 | Ginsburg | G01S 7/023 |
| 11,175,376 | B2 * | 11/2021 | Melzer | G01S 7/352 |
| 11,175,377 | B2 * | 11/2021 | Bordes | G01S 7/0235 |
| 11,280,876 | B2 * | 3/2022 | Gulati | G01S 7/006 |
| 12,028,796 | B2 * | 7/2024 | Kunjar | H04W 72/30 |
| 2001/0055352 | A1 * | 12/2001 | Bannasch | H04B 13/02 |
| | | | | 375/348 |
| 2002/0061080 | A1 * | 5/2002 | Richards | H04B 1/719 |
| | | | | 375/346 |
| 2002/0061081 | A1 * | 5/2002 | Richards | H04B 1/719 |
| | | | | 375/E1.001 |
| 2007/0188373 | A1 * | 8/2007 | Shirakawa | G01S 13/931 |
| | | | | 342/159 |
| 2008/0106458 | A1 * | 5/2008 | Honda | G01S 7/023 |
| | | | | 342/59 |
| 2010/0019950 | A1 * | 1/2010 | Yamano | G01S 7/352 |
| | | | | 342/104 |
| 2010/0225524 | A1 * | 9/2010 | Szajnowski | G01R 23/02 |
| | | | | 324/76.19 |
| 2011/0032801 | A1 * | 2/2011 | Onishi | G01S 15/96 |
| | | | | 367/152 |
| 2012/0127023 | A1 * | 5/2012 | Nakagawa | G01S 7/16 |
| | | | | 342/146 |
| 2012/0197125 | A1 * | 8/2012 | Shibata | A61B 8/14 |
| | | | | 600/443 |
| 2016/0291130 | A1 * | 10/2016 | Ginsburg | G01S 13/32 |
| 2017/0010344 | A1 * | 1/2017 | Corbett | G01S 7/023 |
| 2017/0146645 | A1 * | 5/2017 | Kim | G01S 13/347 |
| 2018/0031674 | A1 * | 2/2018 | Bordes | G01S 7/0234 |
| 2018/0081030 | A1 * | 3/2018 | McMahon | A61B 5/08 |
| 2019/0011533 | A1 * | 1/2019 | Ginsburg | G01S 7/352 |
| 2019/0302224 | A1 * | 10/2019 | Bordes | G01S 7/0232 |
| 2019/0383925 | A1 * | 12/2019 | Gulati | G01S 13/341 |
| 2020/0088838 | A1 * | 3/2020 | Melzer | G01S 7/352 |
| 2020/0088864 | A1 * | 3/2020 | Kim | G01S 7/292 |
| 2020/0191928 | A1 * | 6/2020 | Hope Simpson | G01S 7/52034 |
| 2020/0296659 | A1 * | 9/2020 | Kunjar | G01S 7/023 |

\* cited by examiner

DISCONTINUOUS RADAR TRANSMISSION FOR INTERFERENCE MITIGATION

CROSS-REFERENCE TO RELATED APPLICATIONS

This application is a 35 U.S.C. § 371 national phase of PCT International Application No. PCT/EP2020/072645, filed Aug. 12, 2020, which claims the benefit of priority under 35 U.S.C. § 119 to European Patent Application No. 19191476.1, filed Aug. 13, 2019, the contents of which are incorporated herein by reference in their entirety.

FIELD OF THE INVENTION

The present disclosure relates to interference in radar signals, and in particular to suppression of such interference. The radar systems discussed herein are suitable as vehicle radar systems.

BACKGROUND

Many vehicle radar systems comprise radar transceivers that are arranged for generating radar signals that are transmitted, reflected and received by means of appropriate antennas comprised in the radar system. The radar signals may for example be in the form of FMCW (Frequency Modulated Continuous Wave) signals where frequency chirp signals are formed in a well-known manner.

In a multi-radar environment, radars may interfere with each other as frequency chirps cross or come close to each other in frequency. When this happens, a burst of interference somewhere within the received signal during one or more of the chirp signals can be observed. This problem becomes apparent when the received analog signal has been converted to a digital baseband signal and typically is processed by the radar system using one or more Fast Fourier Transform (FFT) processing steps which converts signals in digital time domain into digital frequency domain signals.

If interference is present in one or more of the chirp signals, the noise floor will be raised since the noise may be spread across a wide band of frequencies. This raising of the noise floor has the effect of reducing the range and accuracy of the radar, which of course is undesirable.

EP 3 489 710 A1 discloses an arrangement for radar interference suppression. Here, interference mitigation is achieved by replacing obtained radar samples by modified samples which are generated based on frequency domain processing of batches of samples. However, additional interference suppression methods are desired.

It is an object of the present disclosure to provide improved methods and devices for interference suppression in radar signals. This object is achieved by a method for suppressing interference in a radar transceiver. The method includes the steps of transmitting a radar signal at a frequency F(t), receiving a radar signal, monitoring frequencies adjacent to the frequency F(t) for interference, and, if interference is detected (S4) in the adjacent frequencies and pausing radar signal transmission for a cross-over time duration. The cross-over time duration may be estimated by observing the aggressor signal prior to it appearing within the IF bandwidth or determined by monitoring it as it traverses across the IF bandwidth.

This way interference to both the radar transceiver and the interfering radar transceiver is avoided, which is an advantage. The method can be used both to mitigate interference from legacy radar transmitters, and also to mitigate interference experienced by legacy radar transceivers. The proposed method is of relatively low complexity and requires no explicit communication between radar transceivers in order to synchronize radar transmission, which is an advantage.

According to aspects of the present disclosure, determining the cross-over time duration includes determining a relative frequency gradient between the transmitted radar signal and an interfering radar signal. By determining a relative frequency gradient, it becomes possible to calculate the cross-over time duration in advance, given the IF bandwidth, without having to track the interference as it traverses across the receive frequency band of the radar transceiver.

According to aspects of the present disclosure, determining the cross-over time duration includes tracking the interference as it crosses a receive bandwidth, or IF bandwidth, of the radar transceiver. The interference can be followed as it traverses the receive frequency band. Thus, the radar transceiver can determine when the interference is no longer present, i.e., having exited the IF bandwidth, whereby radar transmission can be resumed. Consequently, determining the cross-over time duration can be performed implicitly simply by detecting onset and cessation of the interference.

According to aspects of the present disclosure, the monitoring includes filtering the received radar signal to detect signal content at the adjacent frequencies. Filtering is an efficient and robust method for detecting signal content at the adjacent frequencies. By using a filter bank, a frequency slope parameter of the interfering radar transmission can be robustly estimated, which is an advantage.

According to aspects of the present disclosure, the monitoring includes wavelet transforming or Fourier transforming the received radar signal to detect signal content at the adjacent frequencies. Fourier transforming and/or Wavelet transforming provides a more accurate means for detecting and characterizing interference as it traverses over frequency. For instance, a relative or absolute frequency slope parameter of the interfering radar signal can be determined, from which the cross-over time duration can be estimated.

According to aspects of the present disclosure, the monitoring includes storing previously received radar signal segments. By storing previously received radar signal samples it becomes possible to track and characterize one or more interfering radar signals as they cross different section of the transmitted radar signals. Depending on the relative frequency gradients of the transmitted radar signal and the interfering radar signal, the interference time instants will change from sweep to sweep, allowing the radar transceiver to characterize the interfering radar waveform in terms of at least relative frequency slope.

According to aspects of the present disclosure, determining the cross-over time duration includes applying a contention-based back-off routine. If both victim and aggressor have the proposed system fitted, it would be sub-optimal if both radars switched off simultaneously. A random time back-off before switching off transmission may cover this eventuality, as well as random switch-back-on in case it is detected that the other transceiver also switched off—like a kind of mini contention resolution.

According to aspects of the present disclosure, determining the cross-over time duration includes re-configuring a frequency derivative of the transmitted radar signal in dependence of parameters of the detected interference. By flipping the direction of the frequency sweep, the time duration of the cross-over event can be significantly shortened in some cases, which is an advantage.

According to aspects of the present disclosure, determining the cross-over time duration includes determining a fixed cross-over time duration. Using a fixed cross-over time duration represents a low complexity option, which reduces computational burden on the overall system.

According to aspects of the present disclosure, pausing the radar signal transmission includes predicting and repairing the received radar signal. By repairing the received signal, i.e., patching up the missing part, impact to further processing steps is reduced.

According to aspects of the present disclosure, the method also includes adjusting a transmission delay parameter of the transmitted radar signal in dependence of parameters of the detected interference. By, e.g., re-starting a block of chirps when interference is detected, the impact to further processing steps is further reduced.

There are also disclosed herein radar transceivers, control units and vehicles associated with the above-mentioned advantages. The herein disclosed methods may be executed in a vehicle or at least in part by a remote server wirelessly connected to the vehicle.

BRIEF DESCRIPTION OF THE DRAWINGS

The present disclosure will now be described more in detail with reference to the appended drawings, where.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
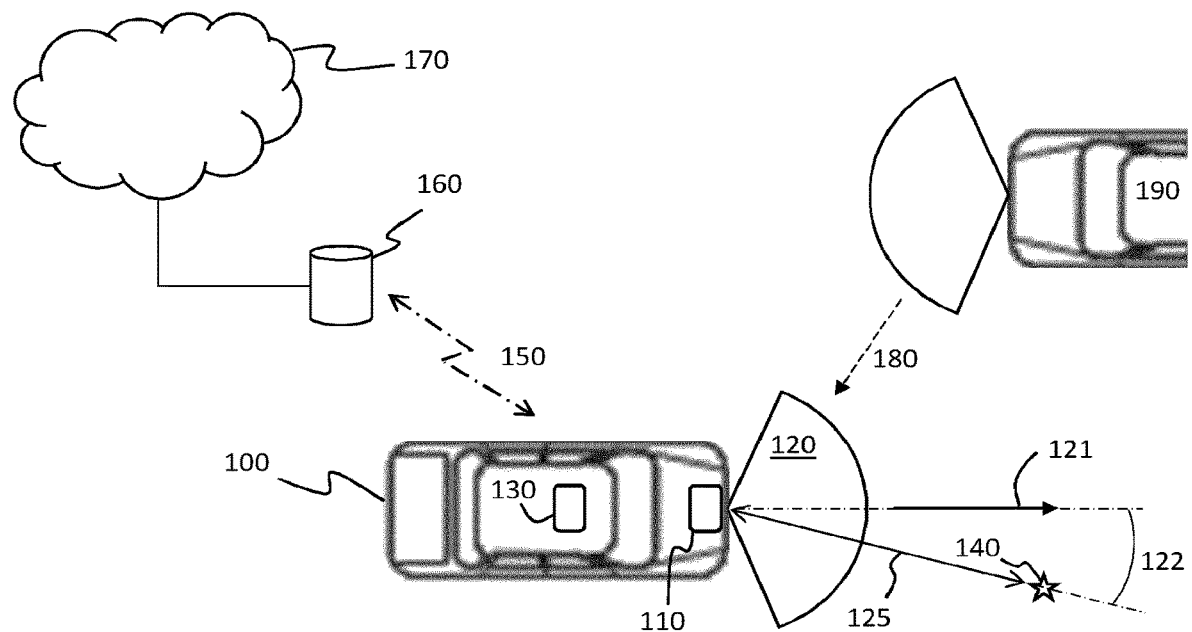
FIG. 1 shows a schematic top view of vehicles.

FIG. 1 shows a vehicle 100 equipped with a vehicle radar system 110, 130. The vehicle radar system comprises at least one vehicle radar transceiver 110 and a radar data processing system or control unit 130. It is appreciated that the radar transceiver 110 and the control unit 130 may be comprised in a single physical unit or may be distributed over more than one physical unit. Some parts of the functionality may even be comprised in a remote server 160 connected to the vehicle via wireless link 150.

According to an example, the vehicle radar system 110, 130 comprises a transceiver arrangement that is arranged for generating and transmitting radar signals in the form of frequency modulated continuous wave (FMCW) signals, sometimes also referred to as radar chirp signals, and to receive reflected radar signals 125, where the transmitted signals have been reflected by an object 140.

Figure 2:
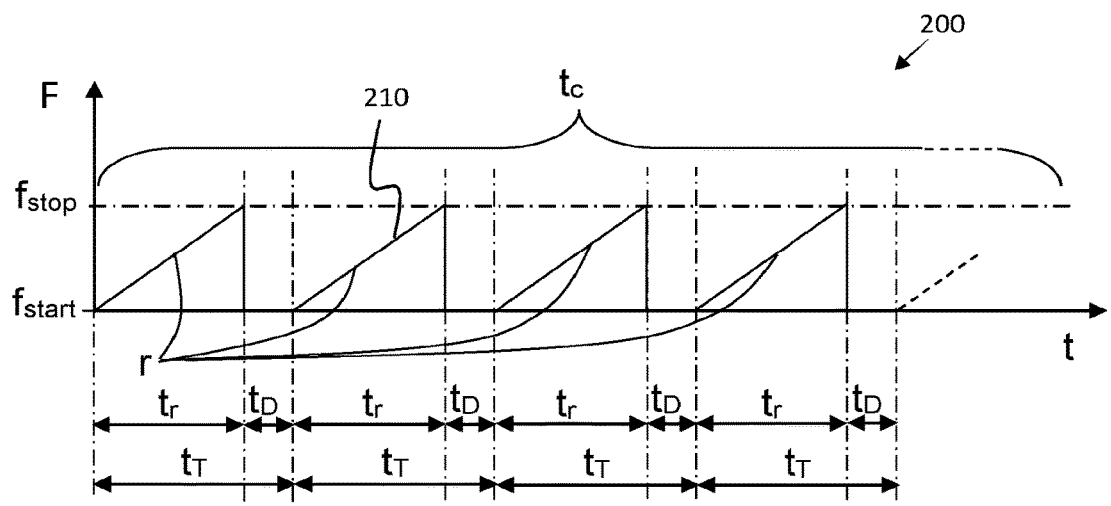
FIG. 2 shows an example of a transmitted radar signal.

As exemplified in FIG. 2, a transmitted FMCW signal is in the form of a continuous wave where the output frequency F(t) varies from a first frequency $f_{start}$ to a second frequency $f_{stop}$ over the course of a ramp r. Most FMCW transmissions comprise repeating cycles of a plurality of frequency ramps r as shown in FIG. 2, however, some radar transmissions only comprise one slow chirp, i.e., different from the example transmission of FIG. 2. A cycle for such a chirp signal lasts for a certain cycle time $t_c$, each ramp r lasts a certain ramp time $t_r$, having a ramp period time $t_T$. Between two consecutive ramps of the chirp signal there is often inserted a delay time $t_D$.

FMCW radar operation and signal processing is known in general and will not be discussed in more detail herein.

With reference again to FIG. 1, the radar data processing system 130 is arranged to control operation of the radar transceiver 110, and to obtain data from the radar transceiver 110, such as detections or data points corresponding to objects 140 in vicinity of the vehicle 100.

The radar transceiver 110 may comprise a single radar unit or a plurality of radar units, potentially of different type and/or of different configuration. The different radar units may, e.g., be arranged as front radars, side radars, and/or rearward facing radars.

The radar transceiver 110 is associated with a field of view 120. In case the radar transceiver 110 is a front radar, a boresight direction 121 of the radar 110 often coincides with a center line of the field of view 120. In case the vehicle radar is instead configured as a side radar, then the boresight direction may point in some other angle compared to the forward direction of the vehicle 100.

The vehicle radar system 110, 130 in FIG. 1 is subject to interference 180 from an external radar transceiver. Such interference can come from a plurality of different sources, including other radar transceivers on the same vehicle 100.

For an FMCW system, interference occurs when two or more radar signals 180, 210 are close together in frequency for a period of time, specifically within the intermediate frequency (IF) receiving bandwidth of each other or cross each other in frequency. The net effect is that the time domain signal, i.e., the raw data or digitally sampled signal obtained after frequency down-conversion of the received radio frequency signal, experiences a burst of interference, which may be high compared to the wanted radar-return signal. There may be multiple interference bursts within a short time window.

It is appreciated that the term 'interference' is here to be interpreted broadly to comprise any signal component or signal comprised in the radar signal which has a detrimental effect on performance of a system making use of the received radar signal. Consequently, interference may comprise any of, e.g., external interference from other transmitters and radio frequency sources, internal interference from circuitry of the radar transceiver or other active components located close to the radar receiver, and pulsed interference signals which are associated with limited time duration. Nevertheless, the techniques disclosed herein are particularly suitable for mitigating interference caused by an interfering FMCW transceiver.

As noted above, the vehicle radar system 110, 130 may be connected via wireless link 150 to a remote server 160, which in turn may be comprised in a remote network 170. This server and network may be configured to assist the vehicle 100 in performing radar interference suppression. For instance, the remote server 160 may be arranged to configure parameters such as detection thresholds used by the control unit 130 and the like remotely, and also transmission parameters of the radar transceiver, such as frequency slopes and the like.

An optional storage module may also be comprised in the vehicle radar system. The storage module may store data comprising information about a surrounding environment of the vehicle 100 and about past vehicle operations, such as past experiences of radar interference and radar interference suppression operations. The storage module will be discussed in more detail below in connection to FIG. 8

Figure 3:
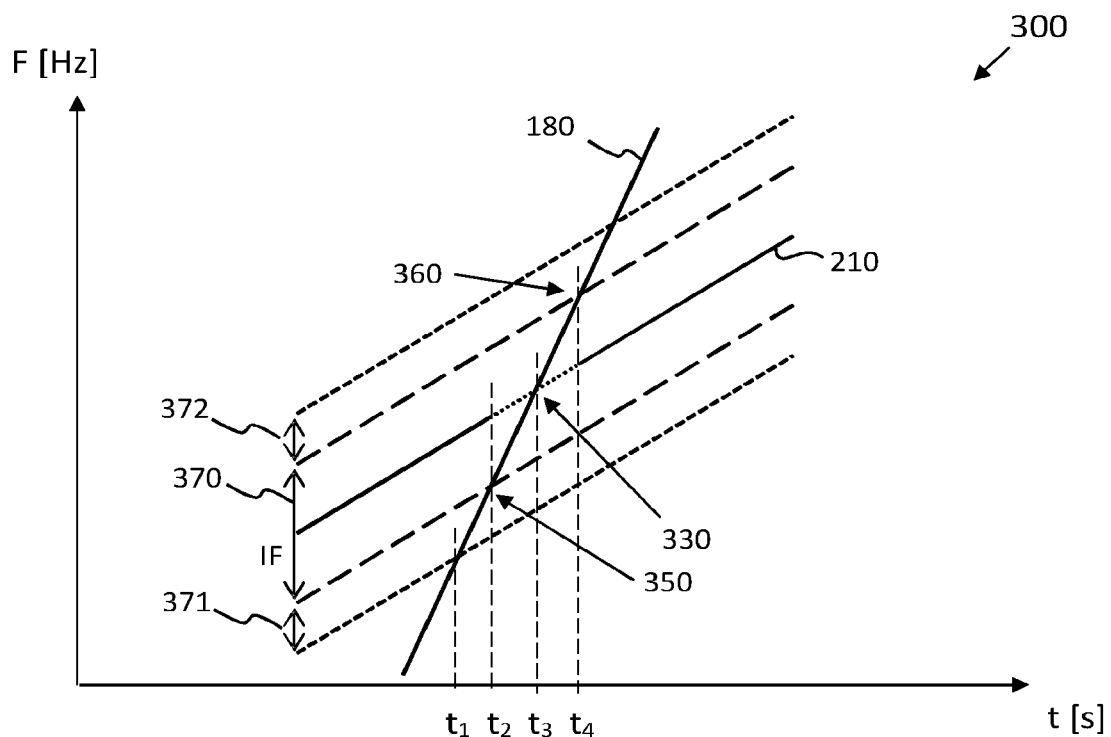
FIG. 3 schematically illustrates radar interference.

FIG. 3 illustrates two FMCW radar signals 210, 180, where the radar signal 210 may be a chirp from the sequence of chirps 200 illustrated in FIG. 2. Thus, the radar signal 210 may correspond to a radar signal transmitted by the vehicle 100, while radar signal 180 is an interfering radar signal. The two radar signals have different frequency slopes, i.e., the frequency change with respect to time is different for the two signals. The two radar signals therefore cross each other at a crossing 330 at time $t_3$, whereupon interference occurs (to both signals).

A radar transceiver, such as the radar transceiver 110 is often associated with a receiving bandwidth in which signals are received, sometimes referred to as the intermediate frequency (IF) bandwidth of the radar transceiver. Radio frequency signals received outside of this bandwidth are filtered out by the receiver. For an FMCW transceiver, the frequency location of the IF band moves linearly over time together with the transmitted center frequency. The IF bandwidth 370 of the radar transceiver 110 is indicated in FIG. 3. It is appreciated that the figure illustrates the case for a single channel mixer (only the I-channel or "real"). In the case of a quadrature down-conversion comprising I and Q outputs, it is understood that the upper and lower sidebands could be available separately at the processor as explained in U.S. 2019/0011533 A1, but the general concept illustrated here would of course still be valid.

With reference to FIG. 3, the interfering radar signal 180 enters the IF bandwidth of the radar signal 210 at time $t_2$, and therefore starts to interfere with the radar signal 210. This interference continues past the point in time $t_3$ when the crossing 330 occurs until the interfering radar signal leaves the IF bandwidth of the radar signal 210 at an exit point 360, which occurs at time $t_4$. Consequently, the radar signal 210 suffers from interference at least during a cross-over time duration from an entry point 350 at time $t_2$ to the exit point 360 at time $t_4$.

The time it takes for the interfering radar signal 180 to cross the IF bandwidth of the transmitted radar signal 210 is obtained as the IF bandwidth (in Hz) divided by the relative frequency slope of the two waveforms (in Hz/sec).

However, this interference need not come as a surprise to the radar transceiver. Frequencies adjacent to the IF bandwidth of the radar transceiver can be monitored. If the radar transceiver continuously or intermittently monitors frequency bands above 372 and below 371 the IF frequency band 370, then the interfering radar signal 180 can be detected before interference occurs. In order to avoid being interfered by the other radar signal, the radar transceiver 110 may pause its transmission during the cross-over time duration for the interference. Thus, the radar transceiver 'dodges' the incoming interference and then resumes normal operation again. During a radio transmission pause, the receive chain of the radar transceiver 110 may either be turned off completely so that nothing is received (including both desired and interfering signal) or be left on in order to monitor or track the interfering signal as it traverses the receive band. In case the receiver is left on, the data would of course not be retained for further processing, but discarded, since there is no transmission from the system at this time. Also, by pausing radar transmission, no interference is generated at the other radar transceiver, thus sparing also the interfering radar transceiver. It is an advantage that the proposed method not only spares the radar transceiver 110 from interference, but also the interfering radar transceiver.

It is appreciated that the interference can be of varying severity, i.e., comprise more or less energy. Strong interference may have a profound impact on detection performance, while weaker interference could be tolerable in some scenarios. According to some aspects the techniques disclosed herein also comprises determining a severity level of the interference, and only pausing transmission if the interference meets some severity criteria. For instance, a threshold on interference power can be set, and only such interference associated with a power above the threshold would then trigger a transmission pause. The threshold can be fixed or adapted during radar operation. For instance, the threshold can start out relatively low in a sequence of chirps and increase each time transmission is paused. This way it can be ensured that the transmitted signal is not paused too often. Also, the threshold can be set in dependence of the traffic scenario, and/or in dependence of the interference scenario.

By pausing radar signal transmission from onset to cessation of radar interference, a discontinuity is generated in the transmitted waveform. Hence, the disclosed technique comprises discontinuous radar transmission in the sense that the transmission may be paused from time to time as interfering radar signals traverse the IF bandwidth of the radar transceiver 110.

FIG. 3 exemplifies this interference mitigation technique; the interfering radar signal 180 is detected between time $t_1$ and time $t_2$ as it enters a frequency band 371 adjacent to the IF frequency band 370. Following detection of the interfering radar signal, the radar signal transmission by the transceiver 110 is paused, shown in FIG. 3 by a dotted line, and then resumed again sometime around time $t_4$ when the interference is no longer present in the receiving bandwidth of the transceiver. Notably, only the actual transmission needs to be paused, e.g., by turning off a power amplifier of the radar transceiver or the like. Internal signal generation preferably continues to be active in order to maintain phase stability, frequency stability, and the like, so that signal transmission can be resumed again without phase jumps once the interference has exited the IF bandwidth.

In other words, FIG. 3 shows an example of a method where a victim transceiver 110 first detects an aggressor 190 within a monitoring bandwidth of the receiver. As the aggressor enters the IF bandwidth of the victim, the victim pauses transmission, but maintains chirp generation internally. When the aggressor signal again leaves the IF bandwidth of the victim, the victim transmission is resumed.

It is noted that if both victim and aggressor have this system fitted, it would be sub-optimal if both radars switched off simultaneously. A random time back-off before switching off transmission may cover this eventuality, as well as random switch-back-on in case it is detected that the other transceiver also switched off—like a kind of mini contention resolution.

Optionally, the victim, i.e., the radar transceiver 110, may send a short modulated signal on top of the chirp indicating that it will momentarily switch off. This could be a digital message which is phase modulated on the carrier or it could be an analogue fade-out, or it could be the chirp stopping at the current continuous wave (CW) frequency (still transmitting for a period), while the phase locked loop (PLL)

continues to generate the un-transmitted chirp (since this will be used to pick-up where it left off after the aggressor has passed). Alternatively, the radar transceivers may signal intent and actions via some other communication channel, e.g., via vehicle to vehicle (V2V) communications or via the remote server 160.

Figure 4:
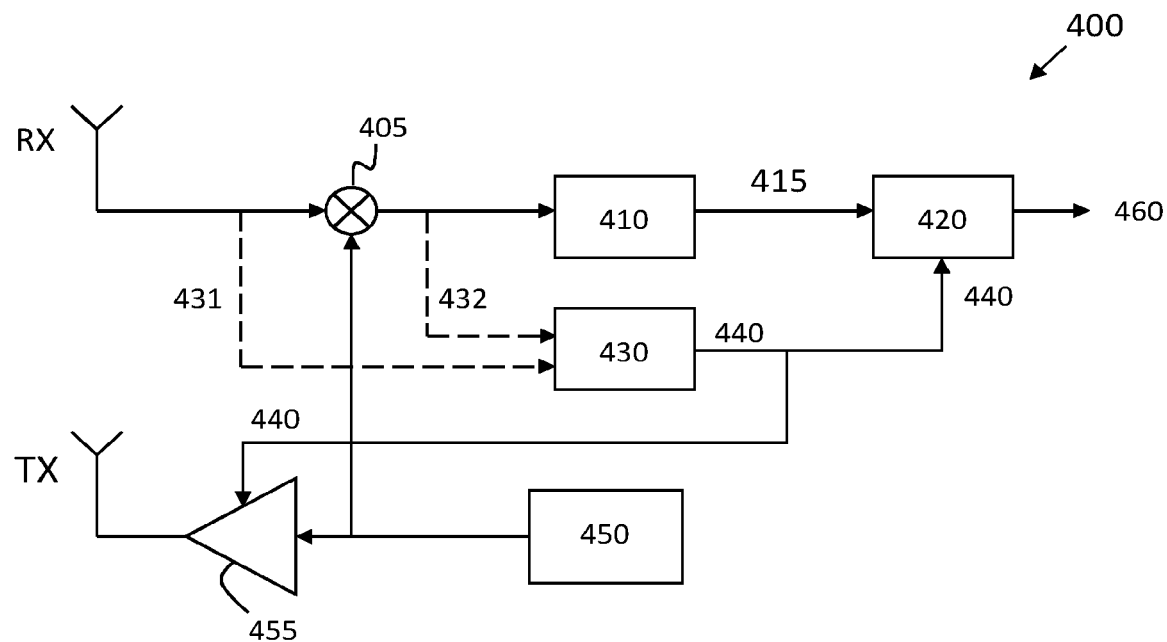
FIG. 4 schematically illustrates a radar transceiver.

FIG. 4 schematically illustrates a radar transceiver 400 arranged to perform the techniques discussed herein. A chirp generator 450 generates the radar signal for transmission. The radar signal is amplified by a power amplifier (PA) 455, before being transmitted from a transmit antenna TX. Radar signals comprising reflected radar signals and any interfering signals are received via a receive antenna RX. The received radio frequency signals are downconverted by a mixer 405 and then filtered and digitized 410 by an analog to digital converter (ADC). Before being forwarded for further signal processing 460 comprising, e.g., Fast Fourier Transform processing (FFT) and the like.

The input to the mixer 405 from the chirp generator, i.e., a voltage controlled oscillator (VCO) or the like, can be left running during a transmission paus such that the interference can be tracked as it traverses through the IF bandwidth by the receiver branch. However, the ADC sampling 410 may be paused or its output not forwarded to further processing 460, since the interference is not of interest—this would be the missed section to fill in with repair methods. However, the ADC samples can of course be used to track the interfering signal as it traverses the IF bandwidth of the radar transceiver 400.

The radar transceiver 400 shown in FIG. 4 also comprises an interference monitoring module 430. This interference monitoring module monitors signal occupancy in frequency bands 371, 372 adjacent to the receiving frequency band of the radar transceiver 400, i.e., the IF band. The interference monitoring module may monitor the received signal at radio frequency 431 and/or after down conversion 432. In case an interfering signal is detected as it enters the monitored frequency bands 371, 372, a control signal 440 is generated which pauses the radar signal transmission. This pausing can be achieved by, e.g., disabling the PA 455 or by switching input to the PA.

The control signal 440 is also received by an ADC repair module 420 which is arranged to compensate for the radar signal transmission pause. The ADC repair module may, e.g., just apply an amplitude tapering to the received signal 415 in order to not affect FFT processing as much. However, the ADC repair module may also replace the received signal during the transmission pause by an ADC repair signal which will be discussed in more detail below in connection to FIGS. 5A-5E.

The ADC repair module 420 may also compensate for the transmission pause by applying any of the repair methods disclosed in EP 3 489 710 A1, which discloses an arrangement for radar interference suppression based on replacing obtained radar samples by modified samples which are generated based on frequency domain processing of batches of samples.

Notably, the chirp generator 450 is kept running regardless of whether the generated signal is actually transmitted or if transmission is paused.

To summarize, FIG. 4 schematically illustrates a radar transceiver 400 comprising a transmit branch TX, 450, 455, arranged to transmit a radar signal at a frequency F(t), and a receive branch RX, 405, 410, 420, 460 arranged to receive a radar signal. The receive branch also comprises an interference monitoring circuit 430 configured to monitor frequencies adjacent to the frequency F(t) for interference, and to generate a control signal 440 if interference is detected at the adjacent frequencies. The transmit branch is arranged to be paused in response to the control signal 440.

According to some aspects, the interference monitoring circuit 430 is configured to determine a cross-over time duration for the interference, and the transmit branch 450, 455, TX is arranged to be paused in response to the control signal 440 for the cross-over time duration. As mentioned above, the cross-over time duration can be estimated from a relative frequency slope between the transmitted radar signal and the interfering radar signal, or it can be implicitly determined by monitoring the interference as it traverses the IF bandwidth of the receiver.

Figure 5A:
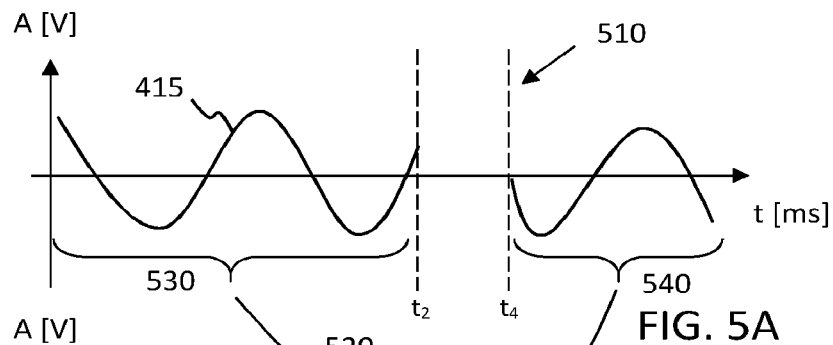
FIGS. 5A-E illustrates radar signal repair.
Figure 5B:
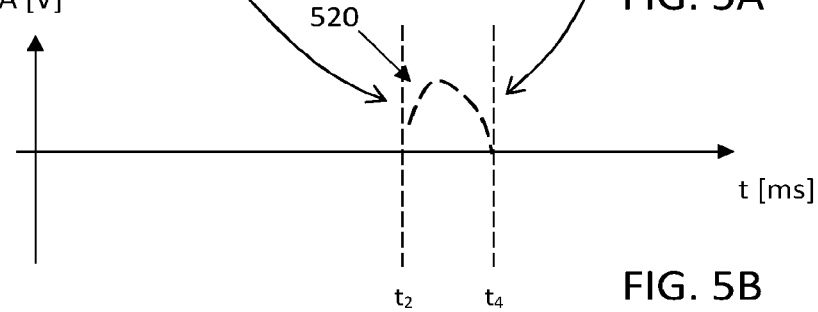
Figure 5C:
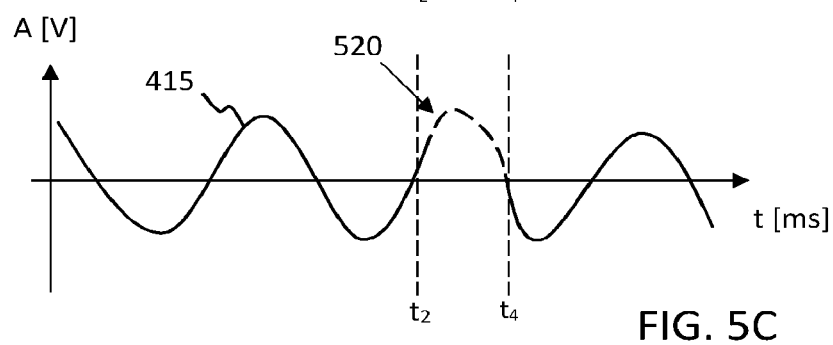

FIGS. 5A-5C show graphs of an example baseband radar signal 415 amplitude A (over time t) in Volts, which illustrate an example of how the radar signal transmission pause can be compensated for by the ADC repair module 420. FIG. 5A shows the received radar signal 415 at baseband or intermediate frequency. A part 510 of the received signal from time instant $t_2$ to time instant $t_4$ was subjected to interference and is therefore missing due to transmit signal pause as discussed above. This empty portion represents an abrupt jump in the signal level which may complicate object detection by, e.g., raising noise floor following FFT processing. It is desired to compensate for this missing signal section by repairing the baseband ADC signal 415.

Since the received radar signal is narrow-band, it exhibits a degree of time correlation. It is therefore possible to 'predict' what it would have looked like based on a weighted combination of at least part of the received radar signal had the radar transmission not been paused. This prediction 520 is illustrated in FIG. 5B. The prediction can be obtained, e.g., as a weighted combination of the received radar signal outside 530, 540 of the interfered section 510.

A gradient descent based method can be used to update finite impulse response (FIR) filter weights to obtain the weighted combination from filtering the received radar signal 415. This method provides a somewhat computationally expensive yet accurate way to determine suitable filter weights. Alternatively, the filter design to generate the weighted combination can be based on some autoregressive model, and the filter weights can be updated based on, e.g., the Burg method. In general, the sequence of time domain samples of the received radar signal 415 can be approximated or modelled by an autoregressive (AR) model. An autoregressive model specifies that the output variable, i.e., the time domain samples x[n], depends linearly on the previous values and on a stochastic term (an imperfectly predictable term). The model is in the form of a stochastic difference equation. Together with the moving-average (MA) model, it is a special case and key component of the more general autoregressive moving average (ARMA) and autoregressive integrated moving average (ARIMA) models of time series.

To find the coefficients on an AR model, here the weights of the filter, a number of different known methods can be used. One such example is the Burg method, also sometimes referred to as the 'maximum entropy estimate'.

This way, if transmission is paused during a cross-over time duration, the missing section 510 due to pausing can be replaced by the prediction 520, as illustrated in FIG. 5C. This way the ADC signal can be 'repaired' and the missing section due to pausing the radar signal transmission can be compensated for in an efficient and reliable manner, which is an objective of the herein disclosed techniques. Since the radar transmission is paused, the interfering radar transceiver is also spared from interference.

Notably, the generation of the prediction signal can be performed in a particularly efficient manner based on a weighted combination of time domain samples before the interfered section 530 by using an adaptive finite impulse response (FIR) filter trained on the received radar signal 415.

Figure 5D:
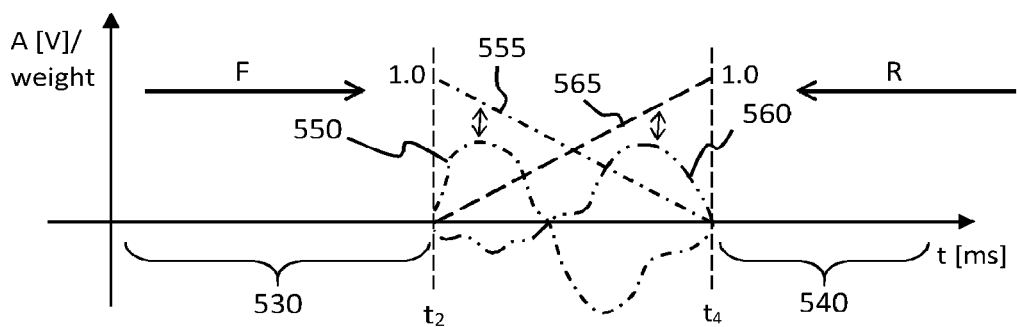

The sequence of time domain samples can also be filtered in both forward F and reverse R directions as indicated in FIG. 5D, i.e., predicting based on both past and future samples of the received radar signal 415 relative to the missing section 510. The forward filter which filter past samples 530 generates one set of predicted samples 550, shown as a dash-dotted line, and the reverse filter which filters future samples 540 in the reverse direction R generates another set of predicted samples 560 shown as a dashed double-dotted line. The longer into the interfered section 510 that each filter progresses, the larger the prediction error is likely to become.

I.e., at the beginning of the missing part 510, the forward filter filtering in direction F is likely to be more accurate and generate a smaller prediction error compared to the reverse filter filtering in direction R. At the end of the missing part 510, the reverse is more likely to be the case, i.e., that the reverse filter generates a smaller error compared to the forward filter. It is proposed herein to merge the two filter outputs by weighting each filter output according to how long into the interfered part the current sample is. The weighting can be linear as indicated in FIG. 5D, where the forward filter weight w1 555 starts from 1.0, and then linearly declines to 0.0, while the reverse filter weight w2 565 starts from 0.0 and linearly increases up to 1.0. The two filter weights then always sum to one. The weighting can also be non-linear, e.g., based on a squared distance from the start of filtering. In such case the filter weights can be determined as $w1=d1^2/(w1+w2)$, $w2=d2^2/(w1+w2)$, where d1 and d2 represent the distance to the predicted sample from the start of the missing part 510 and the end of the interfered part, respectively.

Figure 5E:
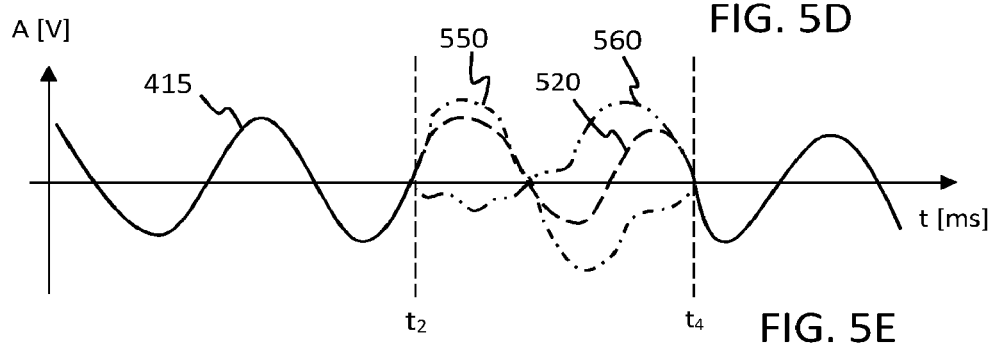

The predicted sample x'[n] for predicting a current sample x[n] may be determined as x'[n]=w1*x1'[n]+w2*x2'[n] (assuming normalized weights w1 and w2), where x1'[n] is the predicted sample from the forward filter and x2'[n] is the predicted sample from the reverse filter. This way a type of "cross-fading" is performed when combining the signal estimate or prediction in forward direction with the reverse direction to get a signal that has no jumps and meets neatly in the middle of the missing section 510. FIG. 5E illustrates the prediction 520 obtained by merging the two filter outputs. It is noted that the forward filter (dash-dotted line) dominates the prediction to the left, while the reverse filter (dashed double-dotted line) dominates the prediction to the right.

Figure 6A:
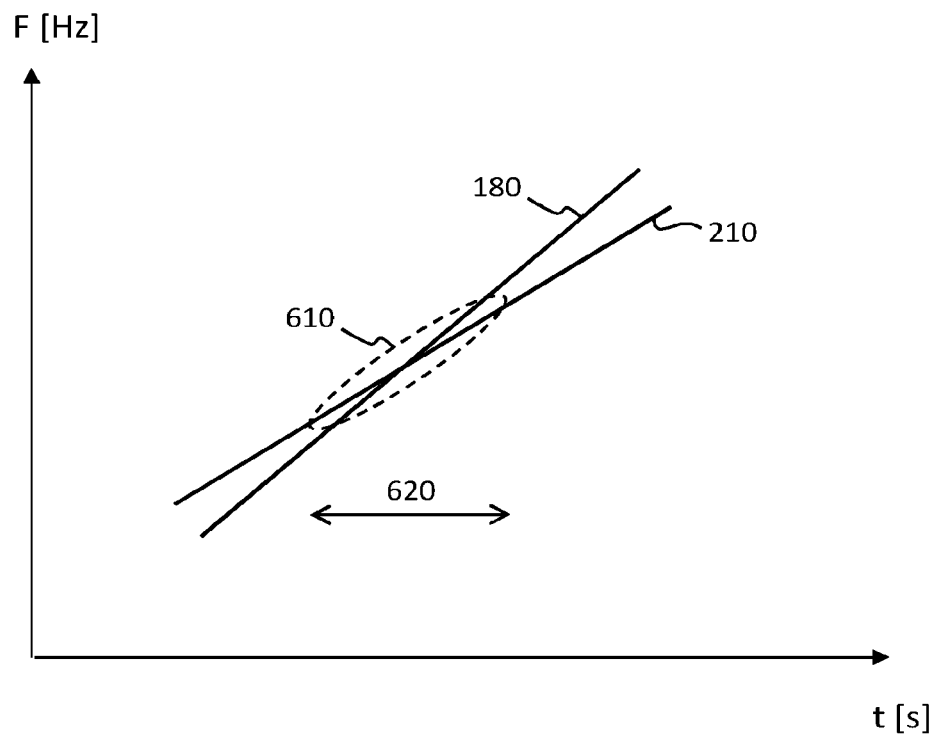
FIGS. 6A-B illustrates example radar signal transmissions.
Figure 6B:
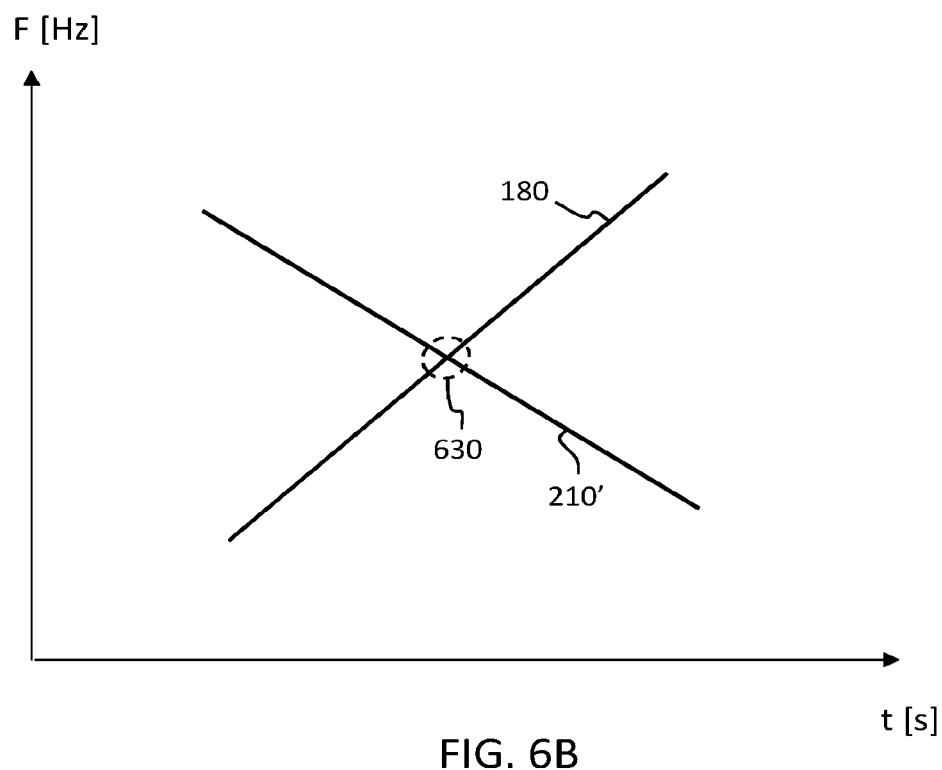

FIG. 6A shows an example interference situation where the interfering radar signal 180 has a similar frequency slope compared to the transmitted radar signal 210. In this case the cross-over event 610 may extend over a long time duration 620, which is not preferred. To improve the interference conditions, the transmitted radar signal may be flipped such that the frequency change in the chirp is of different sign. FIG. 6B illustrates a flipped transmitted radar signal 210'. The interfering radar signal 180 still has the same frequency slope. It is noted that the interference time duration is now much shorter.

It is appreciated that the slope reversal function illustrated in FIGS. 6A and 6B can be implemented independently of the other features discussed herein. Thus, there is disclosed herein a method for interference mitigation comprising detection of an interfering radar signal associated with a frequency slope. The method evaluates a similarity between the frequency slope of the interfering radar signal and a transmitted radar signal. In case the interference duration, i.e., the time it takes for the two radar signal to cross each other, is too long, the method comprises re-parameterizing the transmitted radar waveform in order to shorten the cross-over time duration 620. The re-parameterizing may comprise flipping the frequency ramp, i.e., changing sign of the frequency derivative with respect to time.

Figure 7:
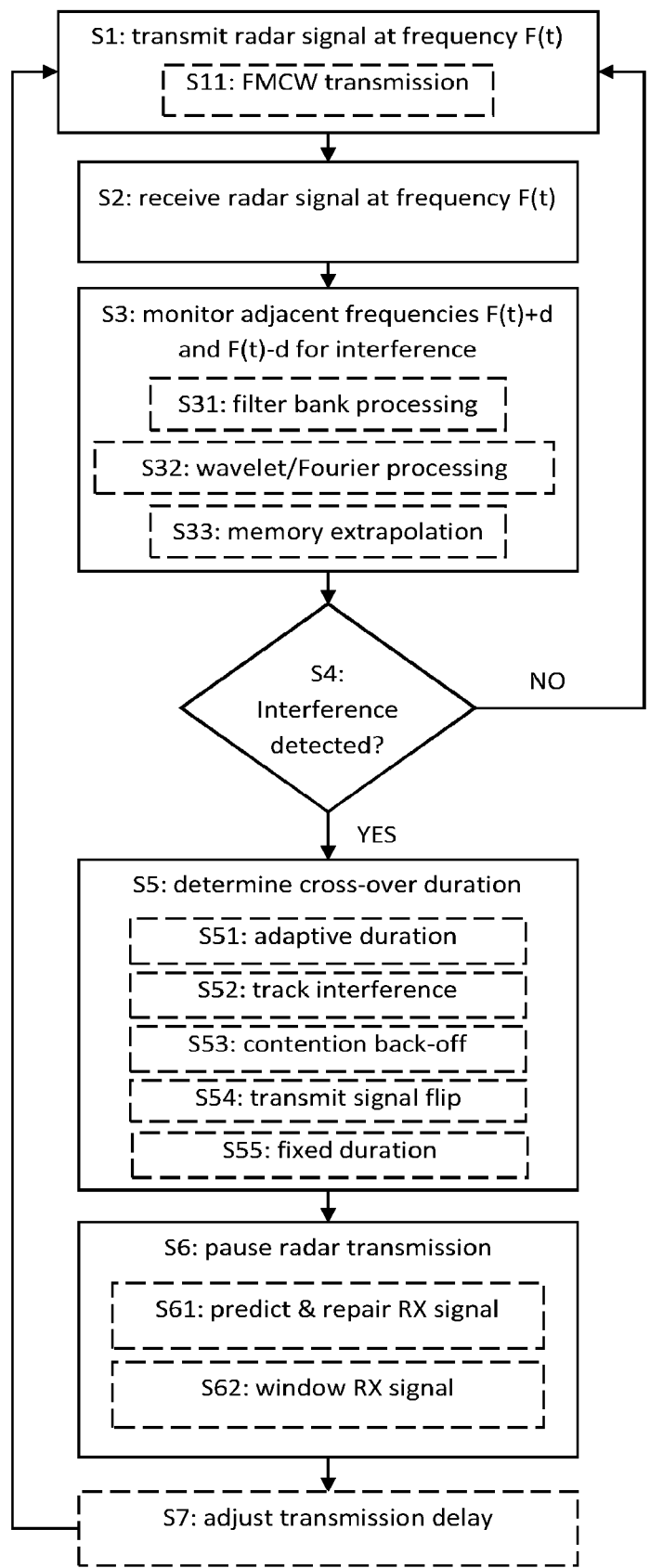
FIG. 7 is a flowchart illustrating methods.

FIG. 7 shows a flow chart illustrating details of methods disclosed herein. There is shown a method for suppressing interference in a radar transceiver 110. The method comprises transmitting S1 a radar signal at a frequency F(t) and receiving S2 a radar signal. The received radar signal may comprise reflections 125 of interest due to objects 140 in vicinity of the radar transceiver 110 but also undesired interfering radio frequency signals, such as other radar signals 180. The transmitted radar signal is preferably but not necessarily a frequency modulated continuous wave (FMCW) radar signal. Notably, the disclosed techniques are also applicable for a radar transceiver generating a wideband radar signal in a frequency band, e.g., an orthogonal frequency division multiplex (OFDM) radar transceiver. This type of transmission can also be paused in order to let an interfering signal associated with a frequency ramp pass.

The method comprises monitoring S3 frequencies adjacent to the frequency F(t) for interference. This monitoring may be focused on frequency bands adjacent to a receiving frequency band of the radar transceiver. As mentioned above, the monitoring may also comprise determining a severity level of the interference. Only interference meeting some severity criteria would then cause transmission paus.

The monitoring may, e.g., include filtering S31 the received radar signal to extract signal content at the adjacent frequencies. In case signal power is detected in a band adjacent to the receiving band of the radar transceiver, there is an indication that interference is present, and that action should be taken. A filter bank can be used to filter out signal content in a number of different sub-bands adjacent to each other and to the receiving band of the radar transceiver 110. As an interfering FMCW signal approaches the receiving band of the radar transceiver 110, signal power will move between the different sub-band filters. This way the frequency ramp slope of the interfering signal 180 can be estimated if the shift in energy is clocked. This frequency slope (in terms of Hz per second) can then be used to determine a suitable pausing time, i.e., an estimate of the cross-over time given the receiving bandwidth of the radar transceiver.

The monitoring may also comprise wavelet transforming or Fourier transforming S32 the received radar signal. This way signal energy at frequencies adjacent to the receiving frequency band of the radar transceiver can be detected, which signal energy is indicative of the presence of an interfering radar signal 180. The wavelet and/or Fourier transform processing will also indicate at which rate the interfering signal approaches the receiving band of the radar transceiver. This rate of change can be used to estimate the cross-over time duration and therefore a suitable transmission paus duration.

Another way to detect interference is to monitor the received signal 415 for sudden jumps and irregularities indicating the presence of interference. These time instants can then be stored in memory and compared between different chirps. The time instances of interferences can then be used to predict when the next interference cross-over will occur, and also the time duration of this cross-over. In other words, according to aspects, the monitoring comprises storing previously received radar signal segments S33.

If interference is detected S4 in the adjacent frequencies, the method determines S5 a cross-over time duration for the interference as discussed above and pauses S6 radar signal transmission for the cross-over time duration. Notably, a signal generator 450, oscillator, PLL, or the like in the radar transceiver 110, 400 may be kept running in order to maintain phase and frequency stability. This allows transmission to resume at the correct phase and frequency which would have been transmitted had the transmission not been subject to pause.

The cross-over time duration can, in a low complexity implementation, be determined S55 as a fixed cross-over time duration. This fixed cross-over time duration can be pre-configured of adapted based on current interference scenario.

Alternatively, according to some other aspects, the method comprises determining S51 a relative frequency gradient between the transmitted radar signal and an interfering radar signal. This relative frequency gradient, i.e., how fast the two signals are approaching each other in frequency, can be used to determine an adaptive cross-over time duration given the receiving bandwidth of the radar transceiver 110.

Determining S5 the cross-over time duration may simply comprise the radar receiver tracking the interfering signal as it traverses the receive bandwidth of the radar transceiver. When the interfering signal exits the receive bandwidth, transmission can be resumed. Thus, determining S5 the cross-over time duration is not necessarily done in advance, but can be done as the interference actually occurs.

Determining S5 the cross-over time duration may also comprise randomizing the determined cross-over time duration. If both victim 100 and aggressor 190 implement the proposed technique of pausing transmission, there is a possibility that both radars are switched off simultaneously, which would be sub-optimal. To alleviate these effects, a random time back-off time before switching off transmission can be used, as well as random switch-back-on. This way, if the interference disappears before it reaches the receiving bandwidth of the radar transceiver, the transmission need not be paused. In other words, the determined cross-over time duration may not necessarily correspond exactly to the time it takes for the interference to traverse the IF bandwidth, since it may also comprise a random perturbation for the reasons mentioned above.

Determining S5 the cross-over time duration may furthermore comprise applying a contention-based back-off routine S53. This would in a way be similar to a carrier sense multiple access system (CSMA) with collision detection (CD) features. Radar transceivers in vicinity of each other would monitor the adjacent frequency bands, i.e., adjacent to their receiving bands, for interference. If interference is present then the transmission is paused with a randomized back-off period. If no interference is present or disappears due to the other transceiver pausing its transmission, then transmission is allowed to continue.

As discussed in connection to FIGS. 6A and 6B above, the method may also comprise re-configuring S54 a frequency derivative of the transmitted radar signal in dependence of parameters of the detected interference. This may mean that the sign of the frequency slope is switched, or that the frequency slope is changed in some way to avoid lengthy interference 620 with the interfering radar signal 180.

As discussed above in connection to FIGS. 5A-5E, pausing the radar signal transmission may optionally comprise predicting and repairing S61 the received radar signal. The methods disclosed in EP 3 489 710 A1 can also be used to cover up missing sections of the received radar signal which are due to pauses in radar signal transmission.

A less complex option of compensating for missing sections of the received radar signal is to apply an amplitude taper, or window function such as a Hamming window, to the received radar signal. This avoids jumps in the signal which could affect outputs of FFT processing in a negative way. In other words, pausing the radar signal transmission may according to some aspects comprise windowing S62 the received radar signal.

An FMCW signal is often windowed prior to FFT processing. This means that the signal is amplitude tapered at the beginning and at the end in order to avoid large signal jumps which may have a negative effect on the output of FFT post-processing. Consequently, if interference occurs at the beginning of the chirp, or at the very end, then interference effects are not so severe. According to some aspects, the method also comprises adjusting a transmission delay parameter of the transmitted radar signal in dependence of parameters of the detected interference. This way interference cross-over time instants can be shifted to the beginning or to the end of a chirp where the effects are not so severe.

One alternative option for repairing the received radar signal in case interference is detected is to wait for the interference to exit the receive bandwidth, and then restart chirp transmission from the lowest frequency in the hope that this chirp, or block of chirps may be received free of interference.

Figure 8:
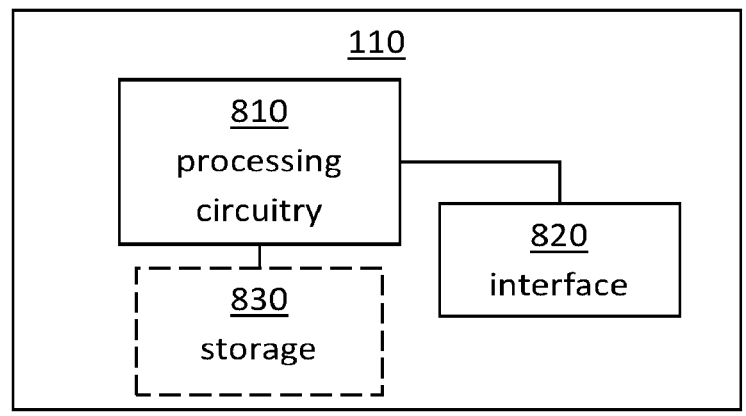
FIG. 8 shows an example control unit.

FIG. 8 schematically illustrates, in terms of a number of functional units, the components of the radar transceiver 110 according to an embodiment. Processing circuitry 810 is provided using any combination of one or more of a suitable central processing unit (CPU), multiprocessor, microcontroller, digital signal processor (DSP), dedicated hardware accelerator, etc., capable of executing software instructions stored in a computer program product, e.g. in the form of a storage medium 830. The processing circuitry 810 may further be provided as at least one application specific integrated circuit (ASIC), or field programmable gate array (FPGA).

Particularly, the processing circuitry 810 is configured to cause the radar transceiver 110 to perform a set of operations, or steps. These operations, or steps, were discussed above in connection to FIG. 7. For example, the storage medium 830 may store the set of operations, and the processing circuitry 810 may be configured to retrieve the set of operations from the storage medium 830 to cause the radar transceiver 110 to perform the set of operations. The set of operations may be provided as a set of executable instructions. Thus, the processing circuitry 810 is thereby arranged to execute methods as herein disclosed.

The storage medium 830 may also comprise persistent storage, which, for example, can be any single one or combination of magnetic memory, optical memory, solid state memory or even remotely mounted memory.

The radar transceiver 110 may further comprise a communications interface 820 for communications with at least one control unit 130, i.e., a radar interface 820. As such, the radar interface 820 may comprise one or more transmitters and receivers, comprising analogue and digital components and a suitable number of ports for wired or wireless communication.

The processing circuitry 810 is adapted to control the general operation of the radar transceiver 110 e.g. by sending data and control signals to the radar interface 720 and the storage medium 830, by receiving data and reports from the radar interface 820, and by retrieving data and instructions from the storage medium 830. Other components, as well as the related functionality, of the radar transceiver 110 are omitted in order not to obscure the concepts presented herein.

Figure 9:
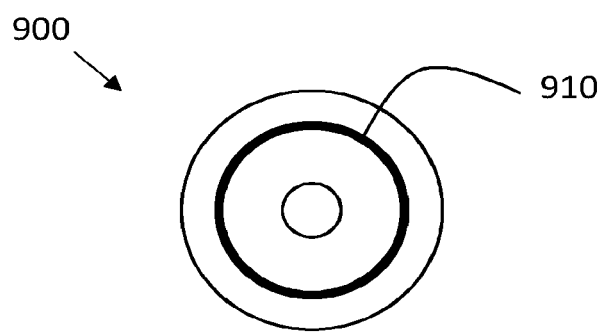
FIG. 9 shows an example computer program product.

FIG. 9 shows a computer program product 900 comprising computer executable instructions 910 to execute any of the methods disclosed herein.

While the above description constitutes the preferred embodiment of the present invention, it will be appreciated that the invention is susceptible to modification, variation and change without departing from the proper scope and fair meaning of the accompanying claims.

The invention claimed is:

1. A method for suppressing interference in a radar transceiver, the method comprising the steps of:
    transmitting a radar signal at a frequency F (t),
    receiving a radar signal,
    monitoring frequencies adjacent to the frequency F (t) for an interference, and, if the interference is detected in the adjacent frequencies,
    determining a cross-over time duration for the interference in advance of an end of the interference, and
    pausing radar signal transmission for the cross-over time duration,
    wherein the transmitting comprises the steps of transmitting a frequency modulated continuous wave radar signal having the frequency F (t), and
    wherein determining the cross-over time duration comprises determining a relative frequency gradient between the transmitted radar signal and an interfering radar signal.

2. The method according to claim 1, wherein the monitoring comprises filtering the received radar signal to detect signal content at the adjacent frequencies.

3. The method according to claim 1, wherein the monitoring comprises wavelet transforming or Fourier transforming the received radar signal to detect signal content at the adjacent frequencies.

4. The method according to claim 1, wherein the monitoring comprises storing previously received radar signal segments.

5. The method according to claim 1, wherein determining the cross-over time duration comprises tracking the interference as it crosses a receive bandwidth of the radar transceiver.

6. The method according to claim 1, wherein determining the cross-over time duration comprises applying a contention-based back-off routine.

7. The method according to claim 1, wherein determining the cross-over time duration comprises re-configuring a frequency derivative of the transmitted radar signal in dependence of parameters of the detected interference.

8. The method according to claim 1, wherein determining the cross-over time duration comprises determining a fixed cross-over time duration.

9. The method according to claim 1, wherein pausing the radar signal transmission comprises predicting and repairing the received radar signal.

10. The method according to claim 1, comprising adjusting a transmission delay parameter of the transmitted radar signal in dependence of parameters of the detected interference.

11. A radar transceiver comprising:
    a transmit branch arranged to transmit a radar signal at a frequency F (t), and a receive branch arranged to receive a radar signal,
    wherein the receive branch comprises an interference monitoring circuit configured to monitor frequencies adjacent to the frequency F (t) for interference, and to generate a control signal if interference is detected at the adjacent frequencies,
    wherein the interference monitoring circuit is configured to determine a cross-over time duration for the interference in advance of an end of the interference,
    wherein the transmit branch is arranged to be paused in response to the control signal and for the cross-over time duration,
    wherein the transmitting comprises the steps of transmitting a frequency modulated continuous wave radar signal having the frequency F (t), and
    wherein determining the cross-over time duration comprises determining a relative frequency gradient between the transmitted radar signal and an interfering radar signal.

12. A vehicle comprising the radar transceiver according to claim 11.

* * * * *